Dec. 3, 1968 W. F. HUCK 3,414,179
APPARATUS FOR VIEWING MOVING WEBS
Filed March 2, 1967 4 Sheets-Sheet 1

INVENTOR
WILLIAM F. HUCK
BY
Albert C. Johnston
ATTORNEY

INVENTOR
WILLIAM F. HUCK
BY
Albert C. Johnston
ATTORNEY

Dec. 3, 1968  W. F. HUCK  3,414,179
APPARATUS FOR VIEWING MOVING WEBS
Filed March 2, 1967  4 Sheets-Sheet 3

INVENTOR
WILLIAM F. HUCK
BY
ATTORNEY

Dec. 3, 1968          W. F. HUCK          3,414,179
APPARATUS FOR VIEWING MOVING WEBS
Filed March 2, 1967          4 Sheets-Sheet 4

INVENTOR
WILLIAM F. HUCK
BY
ATTORNEY

United States Patent Office 3,414,179
Patented Dec. 3, 1968

3,414,179
APPARATUS FOR VIEWING MOVING WEBS
William F. Huck, 81 Greenway Terrace,
Forest Hills, N.Y. 11375
Filed Mar. 2, 1967, Ser. No. 626,909
17 Claims. (Cl. 226—113)

ABSTRACT OF THE DISCLOSURE

An apparatus permitting viewing of patterns on a continuously propelled web by displacement of a length of the web oppositely to the direction of web movement at a fixed viewing zone is provided with an auxiliary displacement system operable to change equally and oppositely the lengths of the paths of the respective web leads entering and leaving the viewing zone so that any desired part of the patterns on the web can be selected for viewing.

---

This invention relates generally to apparatus for viewing moving webs and more particularly is directed to an apparatus permitting direct visual scanning or inspection of a web, or of repetitive patterns printed or otherwise formed thereon, as the web is being propelled continuously at a high speed. Thus, the invention will serve, for example, for the viewing or scanning of patterns on a web being delivered continuously at a uniform high speed from a rotary printing press to a rewinding rollstand or to a perforating, folding, slitting or other apparatus for further processing of the web.

A known apparatus of the nature concerned is disclosed in U.S. Patent No. 2,971,684, issued Feb. 14, 1961, to William F. Huck. Such known apparatus generally comprises two spaced apart rotatable rollers over and between which the web extends to form a flight of constant length passing a fixed viewing zone or station, which rollers are reciprocated together to displace that flight so that the actual speed of movement of the web in its relation to the viewing zone is alternately decreased and increased. The reciprocation of the rollers is synchronized with the web speed so that, in each period of their movement oppositely to the direction of normal web movement past the viewing zone, the actual movement of the web in the displaced flight, relative to the viewing zone, is substantially stopped or arrested. Thus the web can be observed directly by an attendant standing at the viewing zone or station, who can closely inspect the web to determine, for example, whether there are printing flaws or whether patterns printed on the web have the required register quality or color value.

When the repetitive patterns printed or otherwise applied on the web have a large repeat length, the known apparatus does not enable satisfactory observation of the quality of an entire repeat length of the patterns. In order to enable the viewing of a large repeat length in its entirety, it would be necessary to have the reciprocated rollers spaced apart by a distance at least as great as the repeat length, and this would require an undesirably large and costly apparatus. Further, close observation of the web over the entire area of a large repeat length would require movement and re-focussing of the observer's eyes from place to place thereover in a manner and with quickness preventing attainment of the desired notice and perception of possible defects, particularly since the viewing must be accomplished in a relatively brief period during which the observed web flight is at rest.

On the other hand, if the distance between the reciprocated rollers is smaller than the repeat length of the repetitive patterns, then only a portion of a repeat length can be observed while the relative movement of the web flight is arrested, and any reciprocation of the rollers so timed as to correspond in duration to the period of movement of a whole multiple of the repeat length through the viewing apparatus will cause the same portion of the repeat length to be observed in the viewing zone in successive operations of the apparatus. Thus, any defects occurring in other portions of the repeat length will not be detected. While this limitation might be avoided by timing the reciprocation of the rollers so that more or less than a whole multiple of the repeat length would pass through the apparatus during each reciprocation of the roller carriage, there would then be a progression of different pattern areas presented for viewing in the successive operations, and the observer would not be able to cause the same portion of the repeat length to appear at the viewing zone during two or more successive operations, as might be desired to permit careful scrutiny of any defects appearing therein. Further, there would be no way for the observer to know what portion of the repeat length would be presented for inspection when he initiated operation of the viewing apparatus.

Accordingly, it is an object of this invention to provide a relatively compact apparatus by which patterns of relatively large repeat length on a web continuously moved in one direction can be efficiently and closely inspected by direct observation at a fixed viewing zone.

Another object is to provide an apparatus for the above purpose which makes it possible to select a particular part of the repeat length of the patterns on the web as the region thereof to be viewed in the fixed viewing zone during each of the successive periods when the web movement is there arrested.

A further object is to provide apparatus of the described character having means to identify the part of the repeat length of the patterns selected as the region of the web to be viewed during each period when the web movement through the viewing zone is arrested.

Still another object is to provide apparatus of the described character permitting the observer to select, at will, any one of a number of different modes of operation by which either (1) different parts of the repeat length of the patterns are presented to view in a step-by-step manner according to a predetermined program, or (2) the part of the repeat length exposed to view during one operating cycle is replaced by the next adjacent part of the repeat length for the next operating cycle, or for as many subsequent cycles as desired, or (3) the part of the repeat length observable at the viewing zone during one operating cycle may be relatively rapidly replaced by a remote part of the repeat length to be viewed during subsequent cycles.

The present invention can make use of apparatus of known nature for permitting the viewing of patterns on a web being propelled continuously in a certain direction. To this end, the web is led to, through and from a fixed viewing zone by guiding means which include relatively fixed web guides and displaceable web engaging members that position respective leads of the web entering and leaving the viewing zone, and periodically operable means are provided for displacing said members simultaneously relative to the fixed guides so as to increase and decrease equally the lengths of the respective paths of the entering and leaving web leads at a rate so correlated to the speed of propulsion of the web that the movement of the web through the viewing zone is arrested sufficiently to enable viewing of a region of the web in such zone.

According to the present invention, such an apparatus is combined with auxiliary web displacing means which are operable independently of said periodically operable means and serve to change equally and oppositely the lengths of the respective paths of said entering and leaving web leads and correspondingly to displace the web lengthwise relative to the said displaceable web engaging members. By controlling the operation of such auxiliary web displacing means it becomes possible to select any desired part of the repeat length of the patterns on the web as the region thereof to be viewed in the fixed viewing zone during each of the successive period when the web is there arrested.

In an advantageous embodiment of the invention, the auxiliary web displacing means comprise additional displaceable members, such as pairs of rollers, respectively positioning portions of the web leads entering and leaving the viewing zone, and means for displacing these additional members as a unit relative to the relatively fixed web guides.

The above and other objects, features and advantages of the invention will be apparent in the following detail description of an illustrative embodiment thereof which is to be read in connection with the accompanying drawings, wherein.

Figure 1:
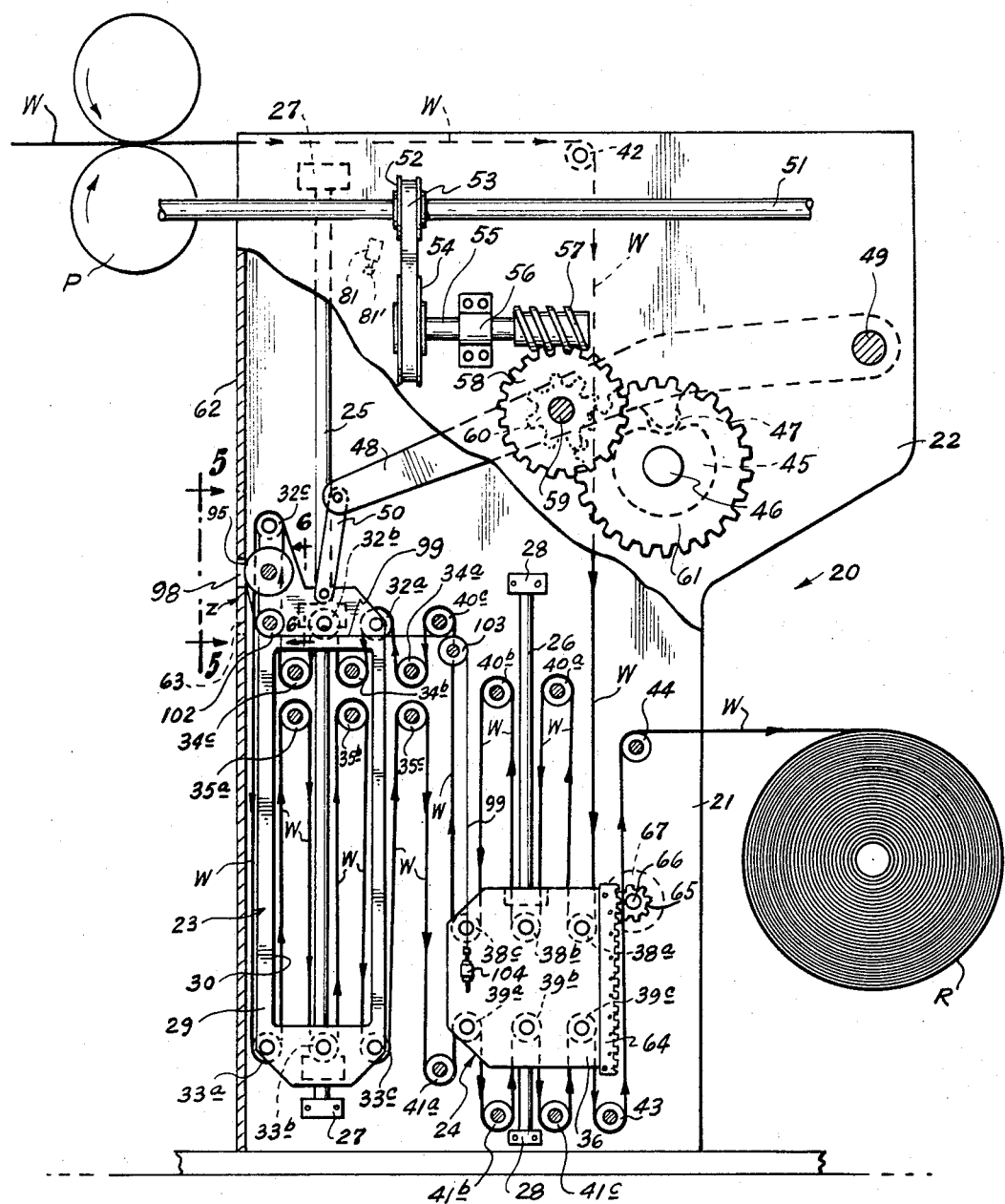
FIG. 1 is a side elevational view of an apparatus embodying the invention, with a part of a side frame thereof being broken away.

Referring to the drawings in detail, and initially to FIG. 1 thereof, an apparatus 20 embodying this invention is there shown employed for scanning or viewing printed patterns on a web W as such web is moved continuously, for example, from a printing press indicated schematically at P, and by which the printed patterns are applied to the web, to a rotated take-up roll R on which the printed web is continuously rewound.

The apparatus 20 has spaced apart, vertical side frame members 21 and 22 between which there are disposed a main carriage 23 and an auxiliary carriage 24 mounted for vertical movement on guide rods 25 and guide rods 26, respectively, which are spaced inwardly from side frame members 21 and 22 (FIGS. 2 and 3) and suitably mounted on the latter, as by brackets 27 and 28.

The main carriage 23, which is located in the forward portion of apparatus 20, is shown to include side frames 29 having vertically elongated cutouts 30 and bearing blocks 31 projecting outwardly from side frames 29 and being slidably mounted on the adjacent guide rods 25. Freely rotatable upper rollers 32a, 32b and 32c are mounted, at their ends, in the upper portions of frames 29 for vertical reciprocation with the latter and are spaced apart from back to front (FIG. 1), and freely rotatable lower rollers 33a, 33b and 33c are similarly mounted, at their ends, in the lower portions of side frames 29 for vertical reciprocation with the latter and are spaced apart from front to back.

A freely rotatable fixed guide roller 34a is supported, at its ends, in side frame members 21 and 22 in back of carriage 23 and is vertically disposed so as to be located below the level of roller 32a when carriage 23 is in its lowermost position, as shown on FIG. 1. Freely rotatable fixed guide rollers 34b and 34c having their opposite ends journalled in side frame members 21 and 22 extend through cutouts 30 of side frames 29 approximately at the same level as guide roller 34a and are located, in the fore and aft direction, between rollers 32a and 32b and between rollers 32b and 32c, respectively. Freely rotatable lower fixed guide rollers 35a, 35b and 35c are supported, at their ends, in side frame members 21 and 22 at locations immediately below fixed guide rollers 34c, 34b and 34a, respectively, so as to be disposed at a level above that of rollers 33a, 33b and 33c when carriage 23 is in its uppermost position.

Auxiliary carriage 24 is located behind main carriage 23 and is also shown to include side frames 36 having bearing blocks 37 projecting outwardly therefrom and slidably mounted on guide rods 26. Freely rotatable upper rollers 38a, 38b and 38c are mounted, at their ends, in side frames 36 and are spaced apart from back to front, and freely rotatable lower rollers 39a, 39b and 39c are mounted at their ends in side frames 36 so as to be disposed below rollers 38c, 38b and 38a, respectively. Fixed, freely rotatable guide rollers 40a, 40b and 40c, mounted, at their ends, in side frame members 21 and 22, are disposed at levels above the uppermost position of carriage 24 and are located, in the fore and aft direction, between rollers 38a and 38b, rollers 38b and 38c, and rollers 38c and 34a, respectively. Fixed, freely rotatable guide rollers 41a, 41b and 41c are similarly supported by side frame members 21 and 22 at levels below carriage 24 in its lowermost position, as shown on FIG. 1, and are located, in the fore and aft direction, between rollers 35c and 39a, rollers 39a and 39b, and 39b and 39c, respectively.

The web W which is continuously propelled toward apparatus 20, as by printing press P, passes over a fixed, freely rotatable guide roller 42 mounted between side frame members 21 and 22 and then travels downwardly toward roller 38a of auxiliary carriage 24. The web W passes alternately under and over rollers 38a, 40a, 38b, 40b, 38c, 40c, 34a, 32a, 34b, 32b, 34c and 32c which rollers serve to guide and position a lead of the web entering a viewing zone Z (FIG. 1) through which passes a flight of the web extending from roller 32c to roller 33a. The web lead leaving viewing zone Z passes alternately under and over rollers 33a, 35a, 33b, 35b, 33c, 35c, 41a, 39a, 41b, 39b, 41c and 39c, and then under and over fixed, freely rotatable guide rollers 43 and 44 which are mounted, at their ends, in side frame members 21 and 22 to guide the exiting, continuously moving web to the take-up roll R.

It will be apparent that downward movement of auxiliary carriage 24 serves to increase and decrease equally the lengths of the respective paths of the leads of web W entering and leaving, respectively, the viewing zone Z and, conversely, upward movement of auxiliary carriage 24 serves to decrease and increase equally the lengths of the respective paths of the web leads entering and leaving the viewing zone. Similarly, upward movement of main carriage 23 serves to increase and decrease equally the lengths of the paths of the web leads entering and leaving, respectively, viewing zone Z and, conversely, downward movement of the main carriage serves to decrease and increase equally the lengths of the paths of the web leads entering and leaving, respectively, the viewing zone. Thus, upward or downward movements of carriages 23 and 24, either simultaneously or independently of each other, do not affect the total length of web guided through apparatus 20 between guide rollers 42 and 44, and such movements of the carriages can be effected without disturbing or altering the equality of the speeds at which the web enters and leaves apparatus 20.

In order to effect periodic movement of main carriage 23, apparatus 20 includes cams 45 secured on a shaft 46 which is journalled, at its ends, in side frame members 21 and 22. Cams 45 are engaged, from above, by cam follower rollers 47 which are rotatably carried by arms 48. The arms 48 are pivotally mounted, at one end, on a shaft 49 supported, at its ends, by side frame members 21 and 22, and the other, or free ends of arms 48 are connected by pivoted links 50 with the upper end portions of frames 29 of the main carriage. Thus, as cam shaft 46 is rotated, arms 48 are rocked in vertical planes about the axis of shaft 49 to effect corresponding vertical displacements of carriage 23 and of the rollers 32a, 32b and 32c and the rollers 33a, 33b and 33c mounted in such carriage.

In the illustrated apparatus 20, the flight web W extending from roller 32c to roller 33a and which passes through the viewing zone Z extends parallel to the direction of movement of main carriage 23. Thus, during upward displacement of main carriage 23 the movement of the web through viewing zone Z is arrested or slowed as a result of both the upward simultaneous movement of rollers 32a and 33a and the web flight extending therebetween and the increase and decrease equally of the lengths of the respective paths of the web leads entering and leaving the viewing zone, as previously described. Since the displaceable rollers 32a, 32b and 32c and the displaceable rollers 33a, 33b, and 33c cooperate with the fixed rollers 34a, 34b and 34c and the fixed rollers 35a, 35b and 35c, to form three loops or festoons in each of the web leads entering and leaving the viewing zone, upward movement of carriage 23 at a speed equal to one-sixth of the speed at which the web W is fed to and from apparatus 20 will be effective to stop the movement of the web relative to the fixed viewing zone Z and thereby enable viewing of the region of the web which is then positioned in the viewing zone.

Of course, during downward movement of main carriage 23, the speed at which the web passes through viewing zone Z is correspondingly increased so that, during each operating cycle of apparatus 20 corresponding to a complete revolution of cams 45 on shaft 46, the length of web traveling through viewing apparatus 20 is exactly equal to the lengths of web that have been received by such apparatus from printing press P and discharged from the viewing apparatus for rewinding on take-up roll R.

The configuration of cams 45 and the rotational speed of cam shaft 46 are preferably selected so that, during the portion of each operating cycle when main carriage 23 is moved upwardly, the region of the web in the fixed viewing zone will be brought to a complete stop relative to the fixed viewing zone for most convenient viewing of such region of the web. Further, the rotational speed of cam shaft 46 is preferably selected so that cams 45 effect a complete revolution corresponding to an operating cycle of apparatus 20 in the time required for the feeding from printing press P to apparatus 20 of a length of the web which is exactly equal to a whole multiple of the repeat length of the printed patterns applied to the web by the press P.

In the illustrated embodiment of the invention, such preferred synchronization of the operating cycle of apparatus 20 and of the speed at which its carriage 23 is moved upwardly during each operating cycle with the speed at which the web is fed to apparatus 20 from the printing press P and with the repeat length of the printed patterns applied to the web is effected by driving cam shaft 46 through a suitable transmission extending from the main drive shaft 51 of the printing press. As shown, such transmission may include a pulley 52 fixed on main drive shaft 51 and driving a belt 53 which runs around a pulley 54 secured on an intermediate shaft 55 journalled in a suitable bearing 56 carried by side frame member 22. Intermediate shaft 55 has fixed thereon a worm 57 meshing with a worm gear 58 secured on a stub shaft 59 rotatable in bearings carried by side frame member 22. Rotatable with worm gear 58 on shaft 59 is a pinion 60 meshing with a spur gear 61 which is fixed on an end extension of cam shaft 46 to drive the latter.

Figure 5:
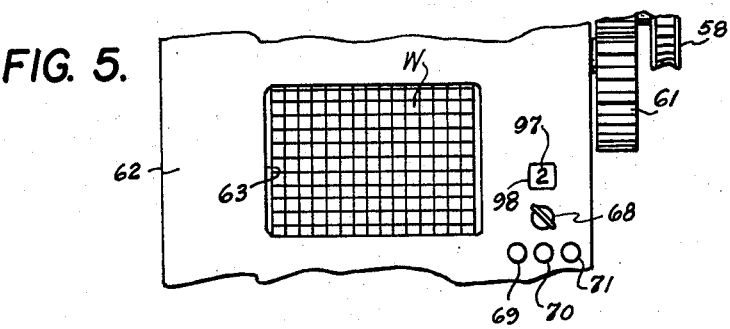
FIG. 5 is a fragmentary elevational view of a portion of the front wall of the apparatus as viewed in the direction of the arrows 5—5 on FIG. 1.

Apparatus 20 is further shown to have a vertical front wall 62 in a plane immediately in front of the flight of web W which extends from roller 32c to roller 33a on carriage 23. A window or opening 63 (FIGS. 1 and 5) is formed in front wall 62 to define viewing zone Z. Such window 63 is vertically disposed so as to be traversed by the web flight extending between rollers 32c and 33a in all positions of carriage 23. Further, window 63 is laterally dimensioned to expose at least the entire width of the web on which the printed patterns appear, and the vertical dimension of window 63, that is, the size of the opening in the lengthwise direction of the web, is selected to correspond to that part of the printed patterns on the web that can be conveniently and carefully inspected for defects, for example, in register or color value, during the period when the web is substantially arrested or stopped in the viewing zone. When the printed patterns applied to the web have a relatively large repeat length, as is usually the case, the vertical dimension of window 63 is only a part or fraction of such repeat length. Since the operating cycle of apparatus 20 is preferably synchronized with the speed at which the web is propelled to and from apparatus 20 and with the repeat length of the patterns applied to the web so that a complete operating cycle occurs during the time required for propelling to and from the apparatus a web length that is exactly equal to a whole multiple of the repeat length, it is apparent that, so long as auxiliary carriage 24 is maintained at any position thereof on guide rods 26, the same part of a repeat length of the patterns on the web will appear at window 63 for viewing by the observer during each of the successive periods when a region of the web is arrested in the viewing zone.

However, displacement of auxiliary carriage 24 either upwardly or downwardly is effective to change equally and oppositely the lengths of the respective paths of the web leads entering and leaving the viewing zone and thereby correspondingly displaces the web lengthwise relative to the rollers of carriage 23 and hence also relative to the fixed viewing zone. Thus, by displacing auxiliary carriage 24 either upwardly or downwardly it is possible to select a particular part of the repeat length of the patterns on the web as the region thereof to be arrested and viewed in the zone Z.

Figures 2, 3:
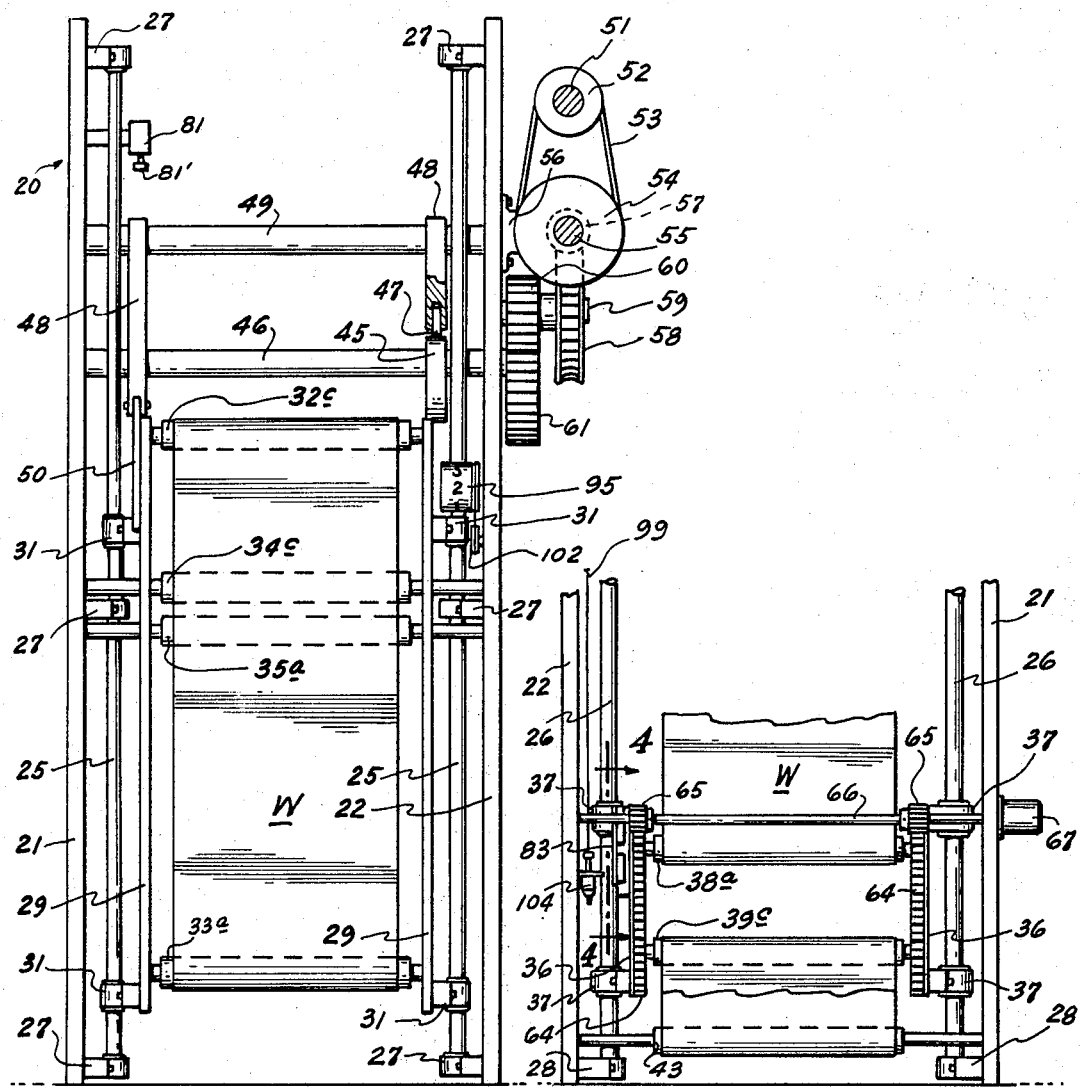
FIG. 2 is a front elevational view of the apparatus shown with its front wall removed.
FIG. 3 is a back elevational view of the lower portion of the apparatus.

In order to effect displacement of auxiliary carriage 24, side frames 36 thereof have gear racks 64 fixed thereon and extending vertically, that is, parallel to the direction of displacement of the auxiliary carriage. Pinions 65 in meshing engagement with gear racks 64 are secured on a shaft 66 which is journalled in side frame members 21 and 22 and driven by a reversible electric motor 67 (FIG. 3).

The apparatus 20 is preferably provided with a system for controlling motor 67 that permits the observer to select, at will, any one of a number of different modes of operation. One of these modes of operation is hereinafter referred to as "indexing operation" and causes different parts of a repeat length of the patterns on the web to be arrested for viewing at zone Z according to a predetermined program during successive operating cycles of apparatus 20. Another of these modes of operation is referred to as "stepping operation" and causes the part of a repeat length exposed to view during one operating cycle to be replaced by the next adjacent part of a repeat length for the next operating cycle or for as many subsequent cycles as desired. Still another of these modes of operation is referred to as "running operation" and permits continuous operation of motor 67 in one direction or the other, for example, to permit a part of the repeat length observable at the viewing zone during one operating cycle to be relatively rapidly replaced by a remote part of the repeat length to be viewed during subsequent cycles.

Figure 7:
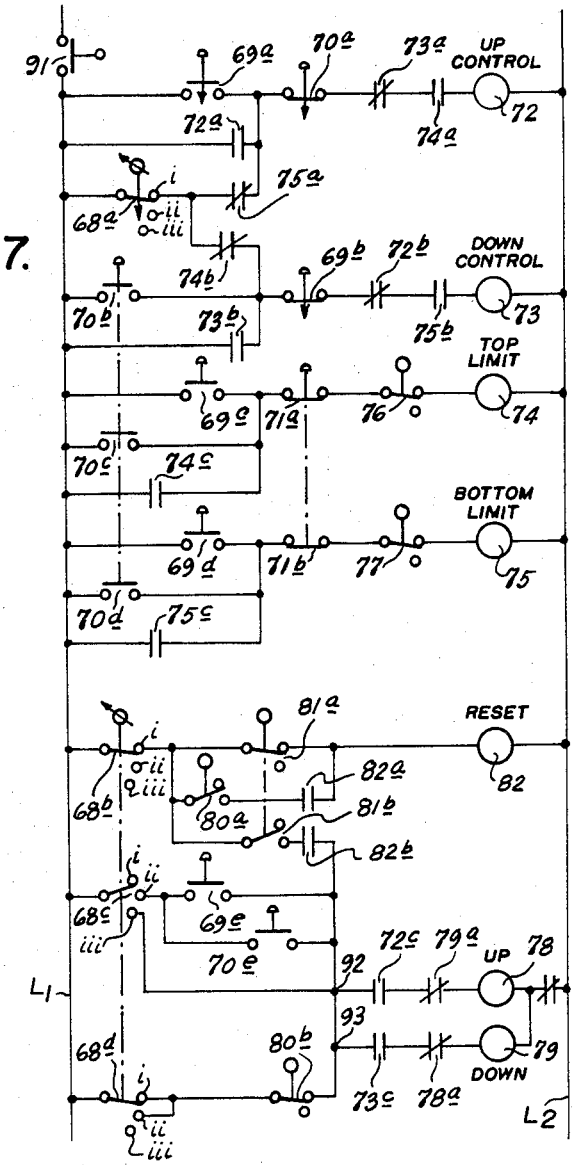
FIG. 7 is a schematic wiring diagram of the controls for the apparatus.
Figure 8:
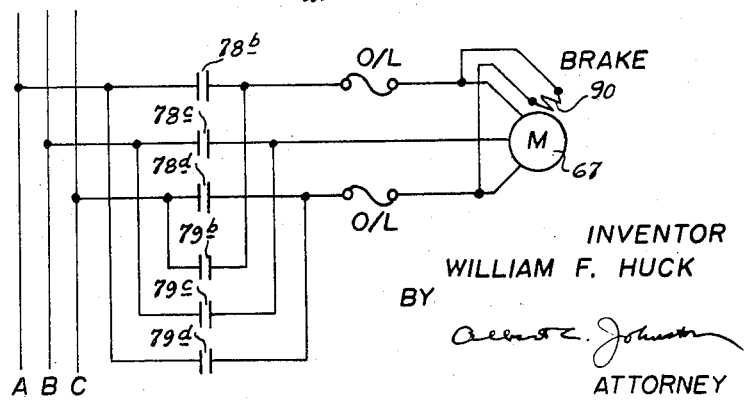
FIG. 8 is a schematic wiring diagram of the controls for a reversible motor included in the apparatus.

A control system permitting such selection of the different modes of operation of motor 67 is illustrated on FIGS. 7 and 8 and generally comprises a selector switch 68 manually displaceable to any one of three settings corresponding to the indexing, stepping and running operations, "up" and "down" push-button switches 69 and 70 for selecting the direction of displacement of auxiliary carriage 24 upon operation of motor 67, and a push-button stop switch 71 for halting the operation of motor 67 at will. As shown on FIG. 5, switches 68, 69, 70 and 71 are all preferably mounted on front wall 62 adjacent window 63 so as to be actuable by the observer from the viewing zone. The control system further generally includes "up" and "down" control relays 72 and 73 which are energized for initiating and continuing the upward and downward movements, respectively, of carriage 24, "top" and "bottom" limit relays 74 and 75 which are energized to halt the upward and downward movements, respectively, of auxiliary carriage 24 when the latter reaches one or the other of predetermined limits of the respective movements at which limit switches 76 and 77 are respectively actuated, "up" and "down" motor starter relays 78 and 79 which, when energized, respectively cause operation of motor 67 in the directions for effecting upward and downward movements of carriage 24, a "stepping" switch 80 which is actuated upon each incremental displacement of carriage 24 in either the upward or downward direction, a timing switch 81 for synchronizing the operation of motor 67 with the periodic displacements of main carriage 23 when selector switch 68 is positioned for indexing operation or stepping operation, and a reset relay 82.

Figure 4:
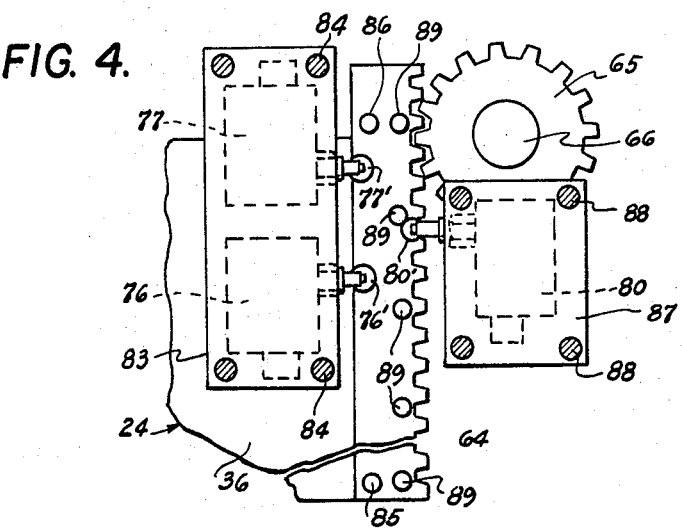
FIG. 4 is an enlarged, fragmentary sectional view taken along the line 4—4 on FIG. 3.

As shown on FIG. 4, limit switches 76 and 77 may be mounted on a plate 83 which is supported by posts 84 extending from side frame member 22 so that their actuating elements 76′ and 77′ will be interposed in the path of travel of pins 85 and 86 projecting from the lower and upper end portions of gear rack 64 on the adjacent frame 36 of carriage 24. Pins 85 and 86 and switches 76 and 77 are relatively located so that pin 85 engages element 76′ to actuate switch 76 at a predetermined limit of the upward movement of carriage 24, and so that pin 86 engages element 77′ to actuate switch 77 at a predetermined limit of the downward movement of carriage 24. Switch 80 is similarly mounted on a plate 87 supported by posts 88 extending from side frame member 22 so that the actuating element 80′ of that switch projects into the path of travel of a vertically arranged series of pins 89 which extend from the adjacent gear rack 64. Pins 89 are spaced apart by distances corresponding to the displacement of carriage 24 necessary to effect lengthwise displacement of the web through a distance approximately equal to the dimension of window 63 in the direction along the web. Thus, upon each such displacement of auxiliary carriage 24 in either the upward or downward direction, a pin 89 will engage element 80′ to actuate switch 80.

As indicated on FIGS. 1 and 2, switch 81 is supported from side frame member 21 so as to be located above the adjacent arm 48, and switch 81 has an actuating element 81′ engageable by the adjacent arm 48 for actuating the respective switch when that arm 48 is in its uppermost position corresponding to the upper limit of the periodic displacements of main carriage 23.

As shown on FIG. 7, starter relays 78 and 79 have normally closed contacts 78a and 79a interposed in the energizing circuits for starter relays 79 and 78, respectively, so that each starter relay can be energized for operating motor 67 in the corresponding direction only when the other starter relay is deenergized. As shown on FIG. 8, relay 78 further has normally open contacts 78b, 78c and 78d which are closed upon energization of relay 78 to connect motor 67 to three phase power supply lines A, B and C for operating the motor in the direction corresponding to upward movement of carriage 24. Starter relay 79 similarly has normally open contacts 79b, 79c and 79d which are closed upon energization of relay 79 for reversing the connections between motor 67 and power supply lines A, B and C and thereby operating motor 67 in the direction corresponding to downward movement of carriage 24. Motor 67 is further preferably provided with a brake (not shown) which is normally applied, as by a spring or the like, to halt rotation of shaft 66 and which is released upon energization of a solenoid 90 (FIG. 8) by the closing of contacts 78b and 78d or the contacts 79b and 79d when motor 67 is operated in one direction or the other.

As shown on FIG. 7, selector switch 68 has sets of contacts 68a, 68b, 68c and 68d each consisting of a movable contact connected to the line $L_1$ of power supply lines $L_1$ and $L_2$, and three fixed contacts i, ii and iii which are respectively engaged by the movable when the selector switch is disposed for indexing operation, stepping operation and running operation.

The circuit for energizing the "up" control relay 72 includes a normally open contact 69a of switch 69, a normally closed contact 70a of switch 70, a normally closed contact 73a of down control relay 73 and a normally open contact 74a of top limit relay 74 all connected in series with the coil of relay 72 between power supply lines $L_1$ and $L_2$, one of which may have a master on-off switch 91 interposed therein. Connected in parallel with switch contact 69a are a normally open holding contact 72a of relay 72, and a circuit including, in series, the fixed contact i of selector switch contact set 68a and a normally closed contact 75a of bottom limit relay 75.

The circuit for energizing the "down" control relay 73 from supply lines $L_1$ and $L_2$ includes a normally open contact 70b of switch 70, a normally closed contact 69b of switch 69, a normally closed contact 72b of "up" control relay 72 and a normally open contact 75b of "bottom" limit relay 75 all connected in series with the coil of relay 73. Connected in parallel with switch contact 70b are a holding contact 73b of relay 73 and a circuit including, in series, the fixed contact i of selector switch contact set 68a and a normally closed contact 74b of "top" limit relay 74.

The circuit for energizing "top" limit relay 74 from lines $L_1$ and $L_2$ includes a normally open contact 69c of switch 69, a normally closed contact 71a of stop switch 71 and the normally closed contact of top limit switch 76 all connected in series with the coil of relay 74. A normally open contact 70c of switch 70 and a normally open holding contact 74c of relay 74 are each connected in parallel with switch contact 69c.

The circuit for energizing "bottom" limit relay 75 from lines $L_1$ and $L_2$ includes a normally open contact 69d of switch 69, a normally closed contact 71b of stop switch 71 and the normally closed contact of bottom limit switch 77 all connected in series with the coil of relay 75. A normally open contact 70d of switch 70 and a normally open holding contact 75c of relay 75 are each connected in parallel with switch contact 69d.

The circuit for energizing reset relay 82 from lines $L_1$ and $L_2$ includes the fixed contact i of selector switch contact set 68b and a normally closed contact 81a of timing switch 81 connected in series with the coil of relay 82. A normally open contact 80a of "stepping" switch 80 in series with a normally open holding contact 82a of reset relay 82 forms a parallel circuit around contact 81a.

A normally open contact 72c of "up" control relay 72 is connected in series with the normally closed contact 79a of "down" starter relay 79 and the coil of "up" starter relay 78 between the line $L_2$ and a junction 92 and, similarly, a normally open contact 73c of "down" control relay 73 is connected in series with a normally closed contact 78a of "up" starter relay 78 and the coil of "down" starter relay 79 between line $L_2$ and a junction 93. Connected in series in a circuit from the fixed contact i of selector switch contact set 68b to both junctions 92 and 93 are a normally open contact 81b of timing switch 81 and a normally open contact 82b of reset relay 82. The fixed contact ii of selector switch contact set 68c is connectable to both junctions 92 and 93 through parallel circuits respectively including a normally open contact 69e of switch 69 and a normally open contact 70e of switch 70. The fixed contact iii of selector switch contact set 68c is directly connected to both junctions 92 and 93. Finally, the fixed contacts i and ii of selector switch contact set 68d are both connected through a normally closed contact 80b of "stepping" switch 80 with both junctions 92 and 93.

The above described control system of the apparatus 20 operates as follows:

*Selector switch 68 set for indexing operation*

If auxiliary carriage 24 is initially at its lowermost position at which pin 86 actuates switch 77, then push-button switch 69 is manually actuated or depressed to initiate the upward indexing movement of carriage 24. Such actuation of switch 69 closes its contact 69c to energize "top" limit relay 74, and further closes switch contact 69a to energize "up" control relay 72 through normally closed contacts 70a and 73a and the closing contact 74a of energized relay 74. Energizing of relay 72 closes its holding contact 72a to retain the energized condition of relay 72 until "top" limit relay 74 is deenergized. Energizing of relay 72 further opens its contact 72b to prevent inadvertent energization of "down" control relay 73, for example, through accidental actuation of push-button switch 70, and also closes contact 72c in the circuit for energizing "up" starter relay 78.

Reset relay 82 is normally energized from the closed contact i of selector switch contact set 68b through the closed contact 81a of timing switch 81, or through its holding contact 82a and contact 80a which is closed when a pin 89 actuates switch 80 in the lowermost position of carriage 24. Thus, the circuit for energizing starter relay 78 is initially completed from contact i of selector switch contact set 68b through contact 81b and closed contact 82b of the normally energized reset relay to junction 92 when carriage 23 is moved to its uppermost position to actuate timing switch 81 and thereby close its contact 81b. As a result of such energization of "up" starter relay 78, solenoid 90 is energized to release the brake and motor 67 is also energized through closed contacts 78b, 78c and 78d to operate in the direction for moving carriage 24 in the upward direction.

After the commencement of upward movement of carriage 24, the uppermost pin 89 releases element 80' of stepping switch 80 so that contact 80b thereof returns to its normal closed position. Then, the energizing of starter relay 78 is continued from contact i of contact set 68d through closed contacts 80b, 72c and 79a. However, when, in the course of such upward movement of carriage 24, another of pins 89 engages the actuating element 80' of switch 80, contact 80b of that switch is opened to break the circuit for energizing starter relay 78 and thereby halting the upward movement of carriage 24.

Since reset relay 82 remains energized to close its contact 82b, the subsequent return of main carriage 23 to its uppermost position and the consequent actuation of timing switch 81 to close its contact 81b causes a circuit to be completed for reenergizing starter relay 78 and thereby again effecting upward movement of carriage 24. It will be noted on FIG. 1 that the radially raised portion of each cam 45 that corresponds to the uppermost position of main carriage 23 covers a substantial angular extent of the cam so that switch 81 is actuated by an arm 48 and thereby closes its contact 81b for a period during which the resulting displacement of carriage 24 moves the pin 89 previously engaged with switch actuating element 80' away from the latter. Thus, by the time the downward displacement of main carriage 23 is commenced to release timing switch 81 and thereby open its contact 81b, switch contact 80b is again closed to continue the operation of motor 67 for moving carriage 24 upwardly until the next pin 89 in the series thereof engages switch actuating element 80'.

If arms 48 are moving very slowly, for example, as a result of a slow printing press speed and a correspondingly slow rotational speed of cam shaft 46, or if the printing press, and hence the reciprocation of main carriage 23, is stopped with arms 48 in their uppermost positions so that timing switch 81 is continuously actuated, then the opening of contact 80a when a pin 89 on carriage 24 moves out of contact with switch actuating element 80' breaks the holding circuit of reset relay 82 to deenergize the latter which causes opening of its contact 82b and thereby prevents further movement of carriage 24 until arms 48 are again moved downwardly to release timing switch 81.

From the foregoing it will be apparent that, with selector switch 68 set for indexing operation and switch 69 actuated to initiate such indexing operation in the upward direction, carriage 24 is moved upwardly by increments equal to the spacing between successive pins 89, and that each increment of movement of carriage 24 commences when main carriage 23 reaches its uppermost position. Preferably the speed at which motor 67 effects movement of carriage 24 is sufficient to ensure that each increment of movement of carriage 24 is completed at least by the time main carriage 23 reaches its lowermost position, that is, prior to the upward movement of carriage 23 during which a region of the web is arrested for viewing through window 63 at zone Z. Accordingly, during successive operating cycles of apparatus 20 successive parts of the repeat length of printed patterns on the web W are presented for view at zone Z.

Figure 9:
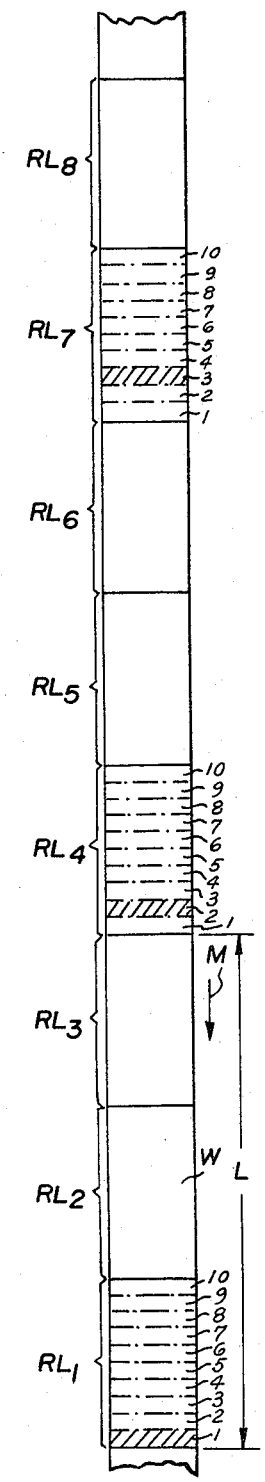
FIG. 9 is a diagrammatic view of a web having patterns thereon with a predetermined repeat length and illustrating the manner in which such patterns may be selectively scanned or viewed with the apparatus embodying the invention.

The parts of repeat lengths of the printed patterns on the web which appear at viewing zone Z during successive operating cycles of apparatus 20 may be parts of contiguous repeat lengths on the web, in which case cam shaft 46 is driven at a speed to provide a complete operating cycle of apparatus 20 during the time required for the feeding of a length of the web to and from the apparatus which is equal to one repeat length. However, as previously mentioned, a complete operating cycle of apparatus 20 may also be made to occur during the time required for the feeding of a length of the web to and from such apparatus exactly equal to any whole multiple of the repeat length. For example, as illustrated diagrammatically on FIG. 9, where the successive repeath lengths of the printed patterns on web W are identified at $RL_1$–$RL_8$, a complete cycle of apparatus 20 may be made to occur during the time required for the feeding of a length L of the web to and from the apparatus 20 in the direction indicated by the arrow M, which length L is exactly equal to three times the repeat length of the printed patterns on the web. In that case, the regions of the web arrested at zone Z during successive operating cycles of apparatus 20 will be parts of every third repeat length on the web, for example, parts of the repeat lengths $RL_1$, $RL_4$, $RL_7$, etc. Further, on FIG. 9, each of repeat lengths $RL_1$, $RL_4$ and $RL_7$ have been divided into parts numbered 1 to 10 and each of which has an area approximately equal to that of window 63. Thus, when indexing operation of the control system for auxiliary carriage 24 is effected as described above so that, during each operating cycle of apparatus 20, carriage 24 is moved upwardly a distance or increment sufficient to displace the web lengthwise relative to viewing zone Z through a distance equal to the vertical extent of window 63, the shaded parts 1, 2 and 3, etc. of repeat lengths $RL_1$, $RL_4$, $RL_7$, etc., respectively, will be presented for view at windows 63 during the successive operating cycles of apparatus 20.

When the upward indexing movement of carriage 24 carries the latter to its uppermost position, for example at the completion of ten operating cycles of apparatus 20 during which parts 1 to 10 of the repeat lengths of the printed patterns on the web have been successively presented to view at window 63, pin 85 engages element 76' of switch 76 to actuate the latter and thereby open its contact for deenergizing "top" limit relay 74. Deenergizing of relay 74 opens its contact 74a to deenergize relay 72 and thereby open its contact 72c which causes deenergization of "up" starter relay 78 to halt upward movement of carriage 24.

It will be noted that, upon the original actuation of switch 69 to initiate upward indexing movement of carriage 24, relay 75 was energized through closing of contact 69d and thereafter maintained in energized condition through its holding contact 75c. Thus, upon deenergizing of "up" control relay 72 and "top" limit relay 74 while "bottom" limit relay 75 remains energized, "down" control relay 73 is energized through normally closed contact 74b of relay 74, normally closed contact 69b of switch 69, normally closed contact 72b of relay 72 and the closed contact 75b of energized relay 75. The energizing of relay 73 closes its contact 73c between starter relay 79 and junction 93, whereby relay 79 is intermittently energized to operate motor 67 in the direction for effecting incremental downward movement of carriage 24 in the manner previously described in detail with reference to its incremental upward movement. During such incremental downward movement of carriage 24, parts 10 to 1 of repeat lengths appear for viewing at window 63 during successive operating cycles of apparatus 20. When indexing downward movement of carriage 24 returns the latter to its lowermost position at which pin 86 engages element 77' to actuate switch 77 and open its contact in the energizing circuit for relay 75, the resulting deenergizing of relay 75 opens its contact 75b to deenergize down control relay 73 and thereby open contact 73c for deenergizing down starter relay 79. Thus, carriage 24 is halted in its lowermost position and remains there until the cycle of indexing operation is again commenced by manual actuation of switch 69.

Of course, if stop switch 71 is actuated at any time during the described indexing movement of carriage 24 in either the upward or downward direction, the opening of contacts 71a and 71b deenergizes relays 74 and 75, respectively, and thereby deenergizes the up control relay 72 or the down control relay 73, and hence the starter relay 78 or the starter relay 79 to stop the motor 67 and prevent further movement of carriage 24 until either the switch 69 or the switch 70 is again actuated.

If carriage 24 is initially at its uppermost position for exposing part 10 of repeat lengths at window 63 during successive operating cycles of apparatus 20, then indexing operation of the control system for carriage 24 is initiated by manual actuation of "down" switch 70. In that case, the closing of switch contact 70d causes energizing of "bottom" limit relay 75 and consequently the energizing of "down" control relay 73 through closed switch contact 70b, closed switch contact 69b, normally closed relay contact 72b and the closed contact 75b of energized relay 75. The energizing of relay 73 closes its contact 73c in the circuit for starter relay 79, whereupon the latter is energized through contact 81b of timer switch 81 and through contact 82b of normally energized reset relay 82 each timer switch 81 is actuated in response to the displacement of main carriage 23 to its uppermost position. Thus, carriage 24 is initially moved incrementally in the downward direction to successively expose parts 10 to 1 of the repeat lengths at window 63 during successive operating cycles of apparatus 20. Upon reaching its lowermost position, carriage 24 causes actaution of switch 77 to deenergize relay 75 and consequently deenergize "down" control relay 73 through opening of relay contact 75b. However, "top" limit relay 74, which was initially energized through closing of switch contact 70c and which has remained energized through its holding contact 74c, closes its contact 74a in the circuit for energizing "up" control relay 72 which circuit is completed through contact 75a closed upon deenergizing of relay 75. Thus, further indexing movement of carriage 24 now occurs in the upward direction for successively scanning or viewing parts 1 to 10 of repeat lengths during successive cycles until carriage 24 returns to its uppermost position where switch 76 is actuated to deenergize relay 74 and hence deenergize relay 72 by opening of its contact 74a for halting operation of motor 67.

*Selector switch 68 set for stepping operation*

When selector switch 68 is set for stepping operation, the movable contact of selector switch contact set 68b moves onto fixed contact ii so that the contacts of timing switch 81 and reset relay 82 are isolated from the remainder of the control circuits. Thus, when push-button switch 69 is actauted, relays 72 and 74 are energized through closed contact 69a and closing contact 74a of relay 74 and through closed contact 69c, respectively, and such relays remain energized through their holding contact 72a and 74c until limit switch 76 is actuated upon movement of carriage 44 to its uppermost position. Each time switch 69 is actuated, its contact 69e is closed to energize "up" starter relay 78 through closed relay contact 72c and relay 78 continues to be energized through closed contact 80b of switch 80 until the latter is actuated by a pin 89 to open contact 80b. Therefore, each actuation of switch 69 results in an upward incremental movement of carriage 24 and, after such movement, the carriage remains at rest. Similarly, upon actuation of push-button switch 70, relays 73 and 75 are initially energized through closed contacts 70b and 70d and thereafter maintained in energized condition through their holding contacts 73b and 75c, respectively, whereby relay contact 73c is closed. "Down" starter relay 79 is initially energized through switch contact 70e and continues to be energized through switch contact 80b until actuation of switch 80 by a pin 89.

By way of example, if carriage 24 is initially at its lowermost position so that parts 1 of repeat lengths appear at window 63 during successive operating cycles of apparatus 20, the actuation of push-button switch 69 will result in a single incremental upward movement of carriage 24 and thereafter carriage 24 will remain in its new position to expose to view parts 2 of repeat lengths during the following operating cycles of the apparatus until either the switch 69 or the switch 70 is again actuated to change the part of a repeat length thereafter appearing at window 63.

Such stepping operation of the control system for carriage 24 makes it possible for the observer to change the part of a repeat length viewed at window 63 in a progressive manner, but not necessarily during successive operating cycles so that, if a defect is detected at a particular part of a repeat length, the same parts of repeat lengths can be made to reappear during successive operating cycles of apparatus 20 for careful examination and assessment of the causes of the defect.

*Selector switch 68 set for running operation*

When selector switch 68 is set for running operation, the movable contact of selector switch contact set 68c is engaged with fixed contact iii thereof, and thus connected with junctions 92 and 93, and this constitutes the only connection then effected through selector switch 68. When push-button switch 69 or push-button switch 70 is actuated, relays 72 and 74 or relays 73 and 75 are respectively energized, as previously described, to close either relay contact 72c or relay contact 73c for effecting continuous operation of motor 67 uninterruptedly moving carriage 24 either upwardly or downwardly, respectively. Such uninterrupted movement continues until push-button stop switch 71 is actuated by the observer or switch 76 or switch 77 is actuated by movement of the carriage 24 to its uppermost or lowermost position, thereby to deenergize the previously energized relay 74 or 75, and hence also deenergize the relay 72 or 73, respectively, for halting further movement of the carriage. The uninterrupted movement of carriage 24 is possible, when selector switch 68 is set for running operation, because switch 80 actuable by pins 89, timing switch 81 and reset relay 82 are all isolated from the control circuits in that setting of the selector switch.

The running operation of the control system for carriage 24 may be employed for effecting relatively rapid lengthwise displacements of the web relative to the displaceable rollers of carriage 23 either during operation of apparatus 20, for example, when it is desired to replace the part of a repeat length being viewed at window 63 to a relatively remote part of a repeat length to be viewed at the window during subsequent operating cycles of the apparatus, or when the apparatus 20 is at rest, for example, in order to bring the web into a desired initial position lengthwise with respect to the displaceable rollers of carriage 23 so that, upon commencement of operation of apparatus 20 a particular part of a repeat length will be viewable at window 63 during the successive operating cycles.

Further, if desired, running operation of the control system for carriage 24 can be employed to extend the length of time during which a region of the web is arrested in the viewing zone. In the latter case, running operation of carriage 24 is initiated immediately upon the conclusion of the upwardly directed stroke of carriage 23. Thus, the period during which a region of the web is arrested in the viewing zone during upward displacement of carriage 23 is extended by the period during which auxiliary carriage 24 is immediately thereafter displaced downwardly to similarly increase and decrease the lengths of the respective paths of the web leads entering and leaving the viewing zone. Such extension of the period during which a region of the web is arrested at the viewing zone, requires that the speed of downward displacement of carriage 24 by operation of motor 67 be correlated with the speed of continuous movement of the web to and from apparatus 20.

Figure 6:
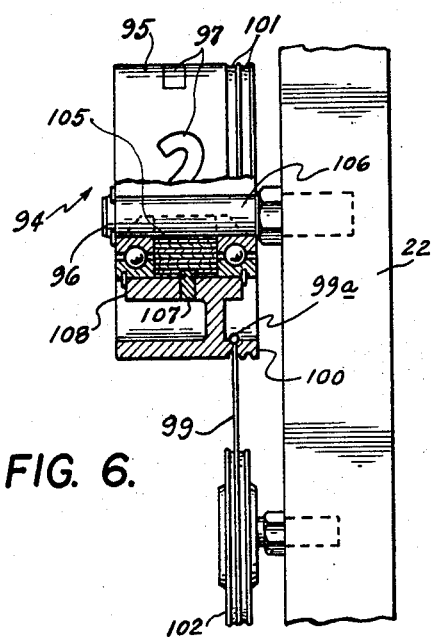
FIG. 6 is an enlarged detail view of a device for identifying the parts of the repeat length of the patterns on the web that are presented for view, and which is shown partly broken away and in section.

In order to enable the observer at the viewing zone Z to identify the part of a repeat length arrested for viewing at window 63 during each operating cycle, apparatus 20 further comprises an indicating device 94 (FIG. 6) that includes an indicator wheel 95 rotatably mounted on a stub shaft 96 projecting from side frame member 22 so as to be disposed behind front wall 62. Numbers or indicia 97 are printed or etched on the periphery of wheel 95 to correspond to the several parts 1 to 10 of each repeat length, and such numbers 97 are selectively viewable through an aperture 98 (FIG. 5) formed in wall 62 in front of wheel 95. A cable 99 is secured at one end, as at 99a, in a flange 100 of wheel 5 and is wound on flange 100 in helical grooves 101 provided thereon for guiding the turns of cable 99 (FIG. 6). The cable 99 extends from wheel 95 under a guide pulley 102 and over a guide pulley 103 (FIG. 1) and has its end remote from wheel 95 adjustably secured to carriage 24, as at 104 (FIGS. 1 and 3). A torsion spring 105 is secured at one end 106 to axle 96 and has its other end secured, as by a pin 107, to the hub 108 of wheel 95 to urge wheel 95 to rotate in the direction for winding cable 99 on flange 100 and thereby maintain tension in the cable so that the rotational position of wheel 95, and the identity of the numerals 97 appearing at aperture 98, always corresponds to the vertical position of carriage 24. Thus, if the web W is initially positioned lengthwise so that part 1 of a repeat length constitutes the region of the web arrested at the viewing zone during each operating cycle so long as carriage 24 is in its lowermost position, and if the number 97 on wheel 95 which identifies such part 1 of a repeat length is disposed on the periphery of the wheel to appear at aperture 98 when carriage 24 is in its lowermost position, then thereafter the number 97 appearing at aperture 98 will identify for the observer the particular part of a repeat length selected for viewing at window 63.

Since only a fractional part of a repeat length appears at window 63 during each operating cycle of apparatus 20, the web flight extending from roller 32c to roller 33a can have a length smaller than the repeat length of the printed patterns on the web in order to minimize the overall dimensions of the apparatus. Further, it is apparent that the apparatus embodying the invention makes it possible for the observer to select the part of a repeat length viewed at window 63 during each successive operating cycle so that, in a number of such cycles, all parts of the repeat length can be successively scrutinized either in accordance with a programmed sequence or otherwise.

Although an illustrative embodiment of the invention has been described in detail herein with reference to the accompanying drawings, it is to be understood that the invention is not limited to that precise embodiment, and that various changes and modifications may be effected by one skilled in the art without departing from the scope and spirit of the invention as defined in the appended claims.

What is claimed is:

1. In an apparatus for permitting viewing of patterns on a web being propelled continuously in a certain direction, including means guiding the web to, through and from a fixed viewing zone, said guiding means including relatively fixed web guides and displaceable web engaging members positioning respective leads of the web entering and leaving said zone, means operable periodically for displacing said members simultaneously relative to said relatively fixed web guides to increase and decrease equally the lengths of the respective paths of said entering and leaving web leads at a rate correlated to the speed of propulsion of said web so that the movement of the web through said viewing zone is arrested sufficiently to enable viewing of a region of the web in said zone, and for returning said members to starting position, the combination therewith of means operable independently of said periodically operable means for changing equally and oppositely the lengths of said respective paths and correspondingly displacing the web lengthwise relative to said displaceable members.

2. An apparatus according to claim 1, said independently operable means comprising additional displaceable members respectively positioning portions of said entering and leaving web leads and means for displacing said additional members relative to said relatively fixed web guides.

3. An apparatus according to claim 1, further comprising means for controlling the operation of said independently operable means so as to select a particular part of the patterns on the web as the region thereof to be viewed in said zone.

4. An apparatus according to claim 1, further comprising means operatively connected with said independently operable means for indicating upon an operation of the latter the extent of corresponding displacement of the web relative to said displaceable members.

5. An apparatus according to claim 1, further comprising means to cause intermittent operation of said independently operable means in timed relation to the operation of said periodically operable means so as to select different parts of the patterns on the web as the regions thereof to be successively viewed in said zone.

6. An apparatus according to claim 5, said independently operable means including reversible drive means, and further comprising means to reverse said drive means upon a predetermined lengthwise displacement of the web relative to said displaceable members in one direction by said intermittent operation of said independently operable means.

7. An apparatus according to claim 1, said independently operable means including reversible drive means, and further comprising direction selecting means actuable to initiate operation of said drive means and to select the direction in which the web is displaced lengthwise relative to said displaceable members in response to such operation of the drive means and means to halt operation of said drive means upon a predetermined lengthwise displacement of the web relative to the displaceable members following each actuation of said direction selecting means.

8. An apparatus according to claim 1, said independently operable means including reversible drive means, and further comprising direction selecting means actuable to initiate operation of said drive means and to select the direction in which the web is displaced lengthwise relative to said displaceable members in response to such operation of the drive means, means to halt operation of said drive means upon a predetermined displacement of the web relative to said displaceable members in each direction, and stop means actuable to halt operation of said drive means at will.

9. An apparatus according to claim 1, said independently operable means including reversible drive means, and further comprising means controlling said drive means including mode selecting means selectively positionable in first, second and third settings, means operable when said mode selecting means is in said first setting to cause intermittent operation of said drive means in timed relation to the operation of said periodically operable means and to reverse said drive means upon a predetermined lengthwise displacement of the web relative to said displaceable members so as to select different parts of the patterns on the web as the regions thereof to be successively viewed in said zone, means actuable when said mode selecting means is in said second setting to initiate operation of said drive means in a selected direction and to halt operation of said drive means after each initiation of the operation thereof upon displacement of the web relative to the displaceable members to an extent which is a fraction of said predetermined displacement of the web, and means actuable when said mode selecting means is in said third setting to effect continuous operation of said drive means in a selected direction until said predetermined displacement of the web relative to said displaceable members has been caused thereby.

10. In an apparatus for permitting viewing of repeated patterns on a web being propelled continuously in a certain direction, including means guiding the web to, through and from a fixed viewing zone, said guiding means including web guiding rollers at relatively fixed positions and paired displaceable web engaging rollers positioning respective leads of the web entering and leaving said zone, a first reciprocable carriage carrying said displaceable rollers and being displaceable periodically relative to said fixed guiding rollers in one direction to increase and decrease equally the lengths of the respective paths of said entering and leaving web leads at a rate correlated to the speed of propulsion of said web so that movement of the web through said viewing zone is arrested sufficiently to enable viewing of a region of the web in said zone, and then in the other direction for returning said displaceable rollers to starting position, the combination therewith of additional paired displaceable rollers respectively engaging said entering and leaving web leads for positioning the respective leads independently of the first mentioned displaceable rollers, an auxiliary carriage carrying said additional rollers and being movable selectively in opposite directions independently of said first carriage to cause said additional rollers to change equally and oppositely the lengths of the respective paths of said entering and leaving web leads and thereby correspondingly displace the web lengthwise relative to said first mentioned displaceable rollers, and means operable to control the positioning of said auxiliary carriage so as to select a particular part of the patterns on the web as the region thereof to be viewed in said zone.

11. An apparatus according to claim 10, further comprising means to effect the periodic displacement of said first carriage in timed relation to the rate at which repeat lengths of the patterns on the web are moved with the web to and from said entering and leaving web leads so that each periodic displacement of said first carriage will cause the same part of said patterns to appear as the region of the web to be viewed in said zone, and indicating means operatively connected with said auxiliary carriage to identify the particular part of said patterns which is to be made viewable in said zone by the positioning of said auxiliary carriage.

12. An apparatus according to claim 10, said first mentioned paired displaceable rollers including a plurality of pairs of such rollers respectively positioning said entering and leaving web leads and cooperating with said fixed guiding rollers to form a plurality of loops in each of said web leads, which loops extend parallel to the directions in which said first carriage is displaceable, whereby the rate at which said entering and leaving web leads are respectively increased and decreased in length is a multiple of the rate at which said first carriage is displaced in said one direction.

13. An apparatus according to claim 10, said means operable to control the positioning of said auxiliary carriage including reversible drive means, means to cause intermittent operation of said drive means in timed relation to the periodic displacement of said first carriage for step-by-step movement of said auxiliary carriage, and means to reverse said drive means when said intermittent operation thereof has moved said auxiliary carriage to a predetermined position.

14. An apparatus according to claim 10, said means operable to control the positioning of said auxiliary carriage including reversible drive means, means to initiate operation of said drive means and to select the direction in which said auxiliary carriage is moved in response to such operation of the drive means, and means to halt operation of said drive means upon movement of said auxiliary carriage through a predetermined distance following each initiation of operation of said drive means.

15. An apparatus according to claim 10, said means operable to control the positioning of said auxiliary carriage including reversible drive means operable to move said auxiliary carriage in either of said directions, means actuable to initiate operation of said drive means and to select the direction in which said auxiliary carriage is moved thereby, means to halt operation of said drive means upon movement of said auxiliary carriage to predetermined limiting positions in said opposed directions, and stop means actuable to halt operation of said drive means with said auxiliary carriage disposed intermediate said limiting positions.

16. An apparatus according to claim 10, said means operable to control the positioning of said auxiliary carriage including reversible drive means operable to move said auxiliary carriage in either of said opposed directions, first control means operable to cause intermittent operation of said drive means in timed relation to the periodic displacement of said first carriage for step-by-step movement of said auxiliary carriage in a selected one of said opposed directions and to reverse said drive means when said step-by-step movement brings the auxiliary carriage to a predetermined limiting position for its movement in said selected direction, second control means operable to initiate operation of said drive means for moving said auxiliary carriage in a selected one of said opposed directions through a predetermined distance, third control means operable to continuously operate said drive means for moving said auxiliary carriage in a selected one of said opposed directions until the auxiliary carriage reaches said limiting position for its movement in said selected direction and including stop means actuable to halt operation of said drive means at will with said carriage intermediate the limiting positions of its movements in said opposed directions, and selector means actuable to selectively condition one of said first, second and third control means for operation.

17. An apparatus according to claim 16, further comprising means to effect the periodic displacement of said first carriage in timed relation to the rate at which repeat lengths of said patterns on the web are moved with the web to and from said entering and leaving web leads so that each periodic displacement of said first carriage will cause the same part of the patterns to appear as the region of the web to be viewed in said zone, and indicating means operatively connected with said auxiliary carriage to identify the particular part of said patterns which is to be made viewable in said zone by the positioning of said auxiliary carriage.

References Cited

UNITED STATES PATENTS

| 3,084,841 | 4/1963 | Hata | 226—113 |
| 3,102,673 | 9/1963 | Aronson | 226—114 X |
| 3,279,370 | 10/1966 | Bunce | 226—33 X |

M. HENSON WOOD, Jr, *Primary Examiner.*

R. A. SCHACHER, *Assistant Examiner.*